US012659297B2

(12) United States Patent
Ieong et al.

(10) Patent No.: US 12,659,297 B2
(45) Date of Patent: Jun. 16, 2026

(54) APPARATUS AND METHOD FOR INTRUSION DETECTION AND PREVENTION OF CYBER THREAT INTELLIGENCE

(71) Applicant: Hong Kong Applied Science and Technology Research Institute Company Limited, Hong Kong (HK)

(72) Inventors: Iat Meng Ieong, Hong Kong (HK); Wai Kei Ricky Leung, Hong Kong (HK); Ka Yuk Lee, Hong Kong (HK); Ting Chung Leung, Hong Kong (HK); Cho Yiu Yau, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 305 days.

(21) Appl. No.: 18/473,210

(22) Filed: Sep. 23, 2023

(65) Prior Publication Data

US 2025/0106185 A1      Mar. 27, 2025

(51) Int. Cl.
*H04L 9/40* (2022.01)
(52) U.S. Cl.
CPC ...... *H04L 63/0245* (2013.01); *H04L 63/1416* (2013.01)
(58) Field of Classification Search
CPC ............. H04L 63/0245; H04L 63/0263; H04L 63/1416
See application file for complete search history.

(56) References Cited

U.S. PATENT DOCUMENTS 7,424,744 B1      9/2008  Wu et al.
7,937,755 B1 *   5/2011  Guruswamy ....... H04L 63/1416
                                                                709/224
(Continued)

FOREIGN PATENT DOCUMENTS

CN      115225301 A      10/2022
CN      115801404 A      3/2023
(Continued)

OTHER PUBLICATIONS

M. Golling, R. Hofstede and R. Koch, "Towards multi-layered intrusion detection in high-speed networks," 2014 6th International Conference on Cyber Conflict (CyCon 2014), Tallinn, Estonia, 2014, pp. 191-206, doi: 10.1109/CYCON.2014.6916403. (Year: 2014).*

(Continued)

*Primary Examiner* — Daniel B Potratz
*Assistant Examiner* — Matthias Habtegeorgis
(74) *Attorney, Agent, or Firm* — IDEA Intellectual Limited; Sam T. Yip

(57) ABSTRACT

An apparatus for intrusion detection and prevention of cyber threat intelligence is provided. The apparatus includes a feature extraction model, a feature selection model, a flow-based intrusion detection module, a packet-based intrusion detection module, and an IPM. The feature extraction model is configured to parse packets from network raw packet data into sessions as a network flow dataset. The feature selection model is configured to select flow-based features from the network flow dataset to generate network flow meta. The flow-based intrusion detection module is configured to generate flow-based labels. The packet-based intrusion detection module is configured to generate packet-based labels. The IPM is configured to perform intrusion analysis according to the flow-based labels and the packet-based labels so (Continued)

as to generate IPM rules for intrusion detection and prevention, thereby identifying and processing the network raw packet data.

20 Claims, 11 Drawing Sheets

(56) References Cited

U.S. PATENT DOCUMENTS

| | | | |
|---|---|---|---|
| 8,677,473 | B2 | 3/2014 | Dennerline et al. |
| 8,813,236 | B1 * | 8/2014 | Saha .................... H04L 63/1408 |
| | | | 726/25 |
| 9,148,439 | B2 | 9/2015 | Hon et al. |
| 2010/0095367 | A1 * | 4/2010 | Narayanaswamy ......................... |
| | | | H04L 63/0263 |
| | | | 726/12 |
| 2012/0233656 | A1 * | 9/2012 | Rieschick ........... H04L 63/1441 |
| | | | 726/1 |
| 2013/0298222 | A1 * | 11/2013 | Zuk ..................... H04L 63/0227 |
| | | | 726/13 |
| 2015/0264073 | A1 * | 9/2015 | Tavakoli ............. H04L 63/1425 |
| | | | 726/23 |
| 2015/0326600 | A1 | 11/2015 | Karabatis et al. |
| 2016/0127402 | A1 | 5/2016 | Veeramachaneni et al. |
| 2017/0279831 | A1 * | 9/2017 | Di Pietro ............ H04L 43/0894 |
| 2022/0070193 | A1 * | 3/2022 | Konda ..................... G06N 3/04 |
| 2022/0224706 | A1 | 7/2022 | Peng et al. |
| 2023/0336527 | A1 * | 10/2023 | Ahn ..................... H04L 63/0236 |
| 2023/0413076 | A1 * | 12/2023 | Kotaru .................. H04W 24/10 |
| 2024/0129321 | A1 * | 4/2024 | Howe ..................... H04L 63/20 |
| 2024/0143768 | A1 * | 5/2024 | Kondapi ............... G06F 21/572 |
| 2024/0378288 | A1 * | 11/2024 | Hussain ................... G06N 5/01 |

FOREIGN PATENT DOCUMENTS

| | | |
|---|---|---|
| KR | 10-1553264 B1 | 9/2015 |
| WO | 2021082339 A1 | 5/2021 |

OTHER PUBLICATIONS

Weicheng Qiu et al., "Hybrid intrusion detection system based on Dempster-Shafer evidence theory", Computers & Security, Elsevier, Mar. 2022, vol. 117, Article 102709.

Brook Andreas et al., "Flow-Based and Packet-Based Intrusion Detection Using BLSTM", SMU Data Science Review, SMU Scholar, 2020, vol. 3, No. 3, Article 8.

Ting-Chung Leung et al., "Flow-Based DDoS Detection Using Deep Neural Network with Radial Basis Function Neural Network", Proceedings of 2022 APSIPA Annual Summit and Conference, Institute of Electrical and Electronics Engineers, Nov. 2022, pp. 1774-1779.

International Search Report and Written Opinion of corresponding PCT application No. PCT/CN2023/130390 mailed on May 22, 2024.

* cited by examiner

FIG. 4

Network flow dataset

| Flow duration | Bwd Packet Length Max | Fwd IAT Max | Bwd PSH Flags | Packet Length Std | down/Up Ratio | Subflow Fwd Packets | Active Max |
|---|---|---|---|---|---|---|---|
| total Fwd Packet | Bwd Packet Length Mean | Fwd IAT Mean | Fwd URG Flags | Packet Length Variance | Average Packet Size | Subflow Fwd Bytes | Active Std |
| total Bwd packets | Bwd Packet Length Std | Fwd IAT Std | Bwd URG Flags | FIN Flag Count | Fwd Segment Size Avg | Subflow Bwd Packets | Idle Min |
| total Length of Fwd Packet | Flow Bytes/s | Fwd IAT Total | Fwd Header Length | SYN Flag Count | Bwd Segment Size Avg | Subflow Bwd Bytes | Idle Mean |
| total Length of Bwd Packet | Flow Packets/s | Bwd IAT Min | Bwd Header Length | RST Flag Count | Fwd Bytes/Bulk Avg | Fwd Init Win bytes | Idle Max |
| Fwd Packet Length Min | Flow IAT Mean | Bwd IAT Max | FWD Packets/s | PSH Flag Count | Fwd Packet/Bulk Avg | Bwd Init Win bytes | Idle Std |
| Fwd Packet Length Max | Flow IAT Std | Bwd IAT Mean | Bwd Packets/s | ACK Flag Count | Fwd Bulk Rate Avg | Fwd Act Data Pkts | |
| Fwd Packet Length Mean | Flow IAT Max | Bwd IAT Std | Packet Length Min | URG Flag Count | Bwd Bytes/Bulk Avg | Fwd Seg Size Min | |
| Fwd Packet Length Std | Flow IAT Min | Bwd IAT Total | Packet Length Max | CWR Flag Count | Bwd Packet/Bulk Avg | Active Min | |
| Bwd Packet Length Min | Fwd IAT Min | Fwd PSH flags | Packet Length Mean | ECE Flag Count | Bwd Bulk Rate Avg | Active Mean | |

FIG. 5

APPARATUS AND METHOD FOR INTRUSION DETECTION AND PREVENTION OF CYBER THREAT INTELLIGENCE

TECHNICAL FIELD

The present invention relates to intrusion detection and prevention for cyber threat intelligence via using an integration of flow-based and packet-based machine learning techniques.

BACKGROUND

Cyber threats have become a significant concern in recent years due to the increasing use of the Internet. In response, much efforts have been made to develop methods for cyber threat intelligence analysis. For instance, intrusion detection systems (IDS) and intrusion prevention systems (IPS) serve to detect and prevent attacks on networks or computer systems are being investigated to address the risk from cyber threats.

However, current IDS/IPS systems generate an excessive number of false alarms or noise, overwhelming cyber security analyst engines with large volume of alerts. Additionally, the continuous addition of rules to the IPS leads to a degradation of detection performance over time. Assessing these rules requires specific knowledge, which is both costly and time-consuming. Furthermore, intrusion detection is either network packet-based or flow-based. In this regard, real-time packet-based IDS/IPS alone cannot detect all types of attacks, while flow-based IDS/IPS cannot provide real-time protection. It has been observed that certain cyber-attacks can only be identified using a flow-based approach. Moreover, traditional IDS/IPS are deployed as network gateways and are only beneficial in a single network environment.

Currently, systems with the hybrid packet and flow-based IDS/IPS approaches are not known to be commercially available. Therefore, there is a need for a hybrid packet and flow-based IDS/IPS with near real-time intrusion prevention module (IPM) rules update capability, which can achieve robust network threat intrusion detection and prevention. Further, the current state of the art is also lacking a cyber security analysis that adopts machine learning (ML) models for more intelligent intrusion detection and prevention.

SUMMARY OF INVENTION

It is an objective of the present invention to provide an apparatus and a method to address the aforementioned shortcomings and unmet needs in the state of the art. In accordance with a first aspect of the present invention, an apparatus for intrusion detection and prevention of cyber threat intelligence is provided. The apparatus includes a network interface, a feature extraction model, a feature selection model, a flow-based intrusion detection module, a packet-based intrusion detection module, and an intrusion prevention module (IPM). The network interface is executed by at least one processor and is configured to receive network raw packet data. The feature extraction model is executed by at least one processor and is configured to parse packets from the network raw packet data into sessions as a network flow dataset. The feature selection model is executed by at least one processor and is configured to select flow-based features from the network flow dataset to generate network flow meta. The flow-based intrusion detection module is configured to analyze the network flow meta and generate flow-based labels. The packet-based intrusion detection module is configured to analyze the network raw packet data and generate packet-based labels. The IPM is configured to perform intrusion analysis according to the flow-based labels and the packet-based labels so as to generate IPM rules for intrusion prevention, thereby identifying and processing the network raw packet data. The IPM is further configured to perform rules optimization for removing obsolete IPM rules.

In accordance with a second aspect of the present invention, a method for intrusion detection and prevention of cyber threat intelligence is provided. The method include steps as follows: parsing packets, by at least one processor, from network raw packet data into sessions as a network flow dataset via a feature extraction model; selecting flow-based features, by at least one processor, from the network flow dataset to generate network flow meta via a feature selection model; analyzing the network flow meta and generate flow-based labels by a flow-based intrusion detection module; analyzing the network raw packet data and generate packet-based labels by a packet-based intrusion detection module; performing intrusion analysis, by an IPM, according to the flow-based labels and the packet-based labels so as to generate IPM rules for intrusion prevention, thereby identifying and processing the network raw packet data.

In the embodiments of the present invention, machine-learning (ML) techniques are introduced into the generation of flow-based labels, effectively handling network security threats. The architecture achieves near real-time ML-based processing, enabling timely identification and mitigation of potential threats. Furthermore, the integration of flow-based labels and packet-based labels allows for rapid and accurate detection and response to cyber-attacks.

BRIEF DESCRIPTION OF DRAWINGS

Embodiments of the invention are described in more details hereinafter with reference to the drawings, in which:

FIG. 4 depicts an exemplary result of features extraction in accordance with an embodiment of the present invention;

FIG. 5 depicts an exemplary result of features selection in accordance with an embodiment of the present invention;

DETAILED DESCRIPTION OF THE INVENTION

In the following description, apparatuses and methods for intrusion detection and prevention of cyber threat intelligence and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
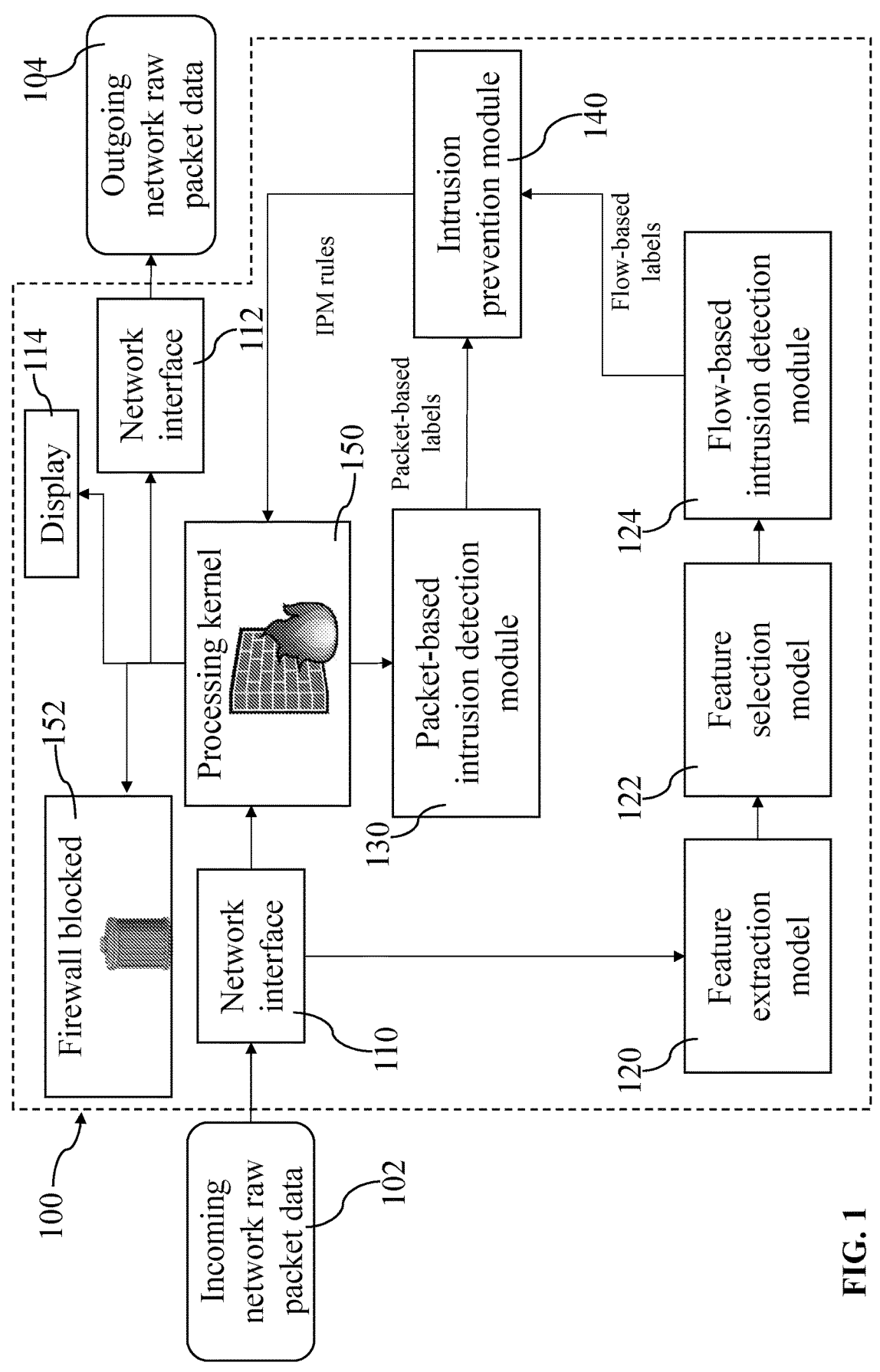
FIG. 1 depicts a schematic diagram of an apparatus for intrusion detection and prevention of cyber threat intelligence in accordance with a first aspect of the present invention.
Figure 2:
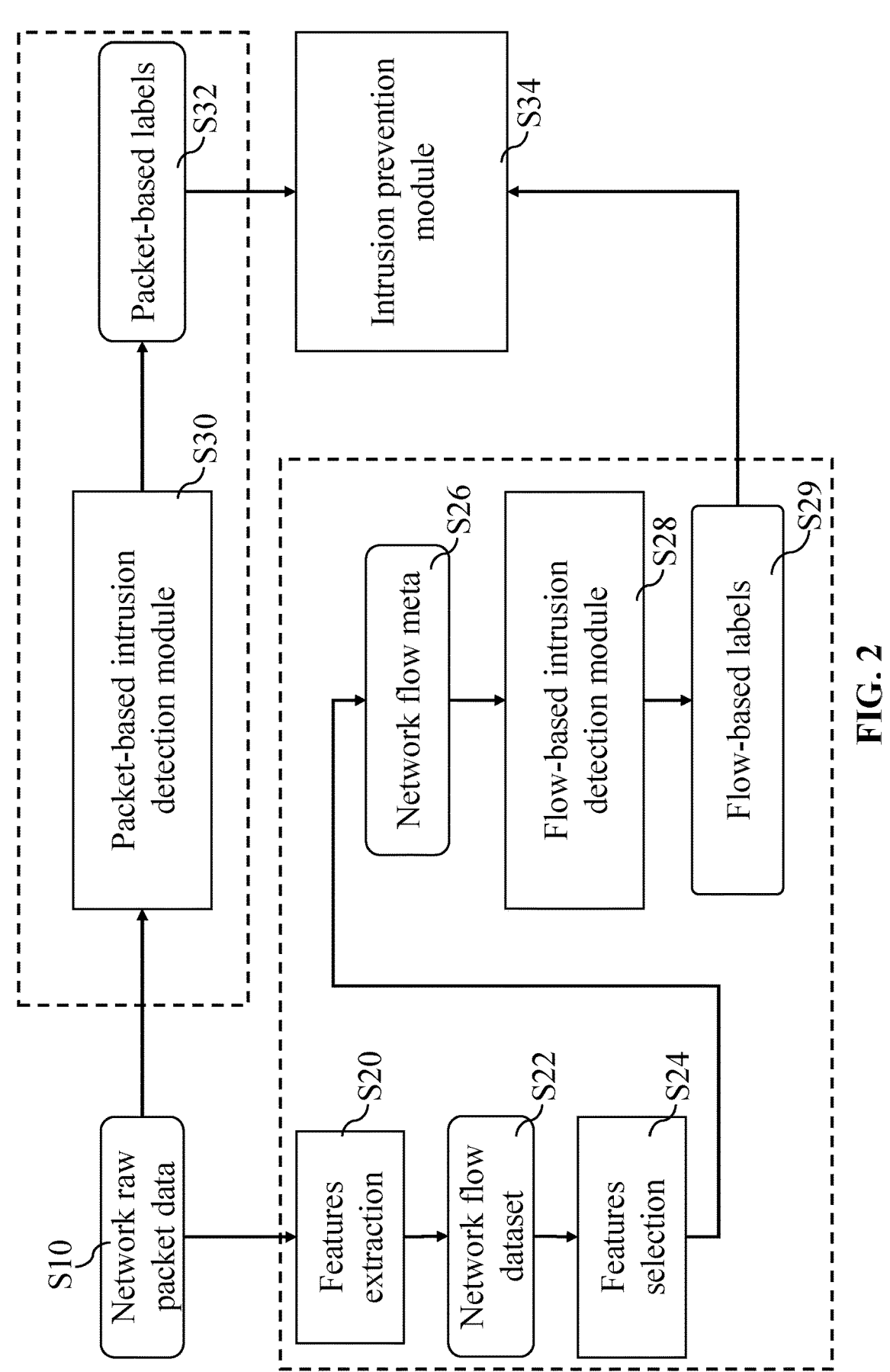
FIG. 2 depicts a schematic diagram of a method with multiple stages for intrusion detection and prevention of cyber threat intelligence in accordance with a second aspect of the present invention.

Referring to FIGS. 1 and 2 for the following description. The apparatus 100 functions as an integration of an intrusion detection system (IDS) and an intrusion prevention system (IPS) for intrusion detection and prevention, including network interfaces 110, 112, a display 114, a feature extraction model 120, a feature selection model 122, a flow-based intrusion detection module 124, a packet-based intrusion detection module 130, an intrusion prevention module (IPM) 140, a processing kernel 150, and a firewall blocked zone 152. In the various embodiments, these logical components conduct data communication using wired or wireless communication with each other; each is executed by at least one processor.

As receiving incoming network raw packet data 102 via the network interface 110, the apparatus 100 processes the network raw packet data 102 according to employed rules to determine if it contains any of malicious traffic and further perform intrusion analysis on it for rules update. In this regard, the apparatus 100 can integrate flow-based and packet-based intrusion detection to generate more precise rules for robust network threat prevention, creating a hybrid flow-based and packet-based IDS/IPS system. The working mechanism of flow-based intrusion detection and packet-based intrusion detection is described as follows.

Figure 3:
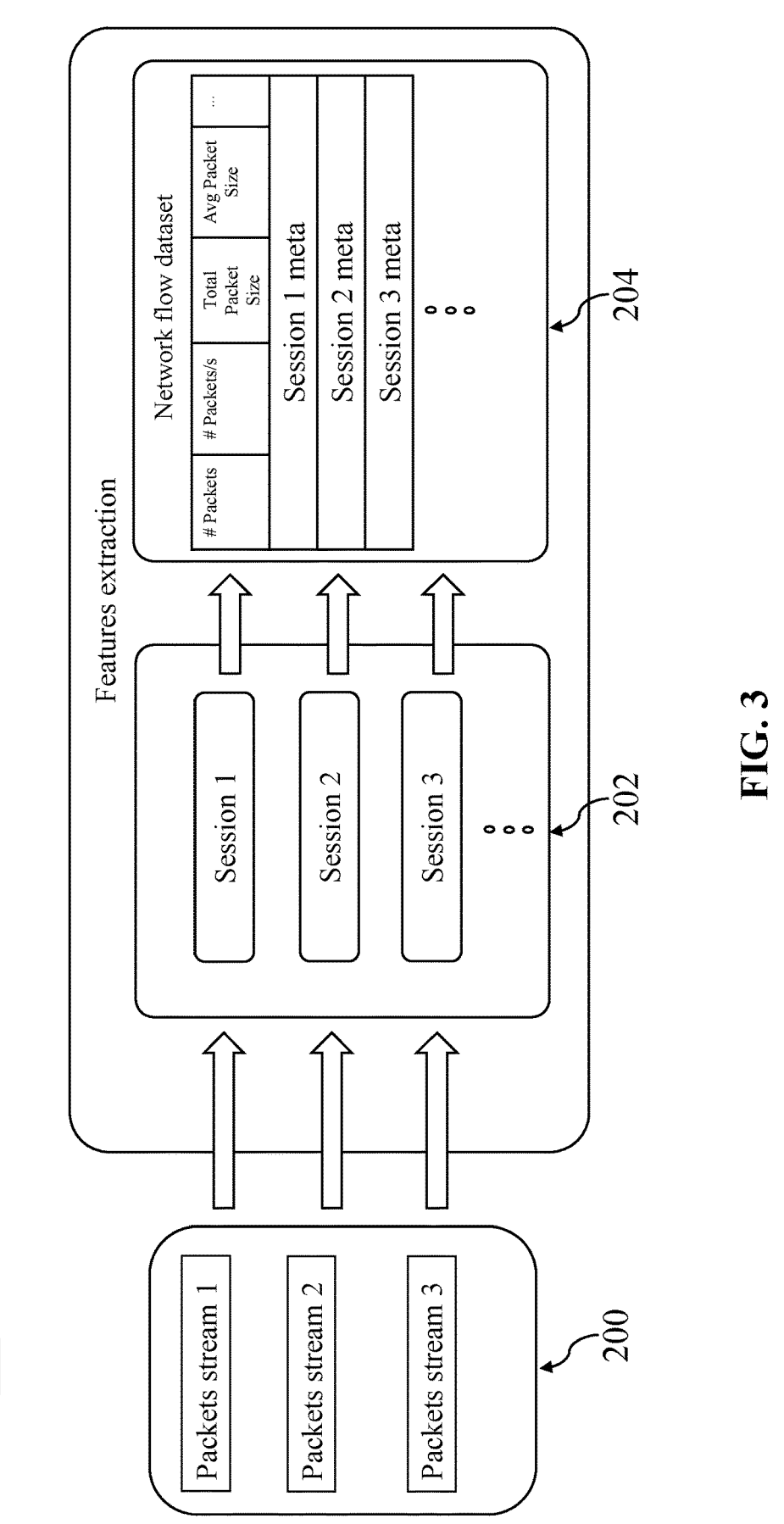
FIG. 3 depicts a schematic diagram of features extraction executed by a feature extraction model in accordance with an embodiment of the present invention.

At the stage S10, the network raw packet data 102 is sent to the feature extraction model 120 from the network interface 110 for features extraction of the stage S20. FIG. 3 depicts a schematic diagram of the features extraction executed by the feature extraction model 120 in accordance with an embodiment of the present invention. In the features extraction of the stage S20, one or more packets of packets stream 200 of the network raw packet data 102 are parsed into multiple sessions 202, and then properties thereof are extracted from the sessions 202. One or more statistical network traffic features are calculated separately in the forward and backward directions from the sessions 202 based on the extracted properties such as duration, number of packets, number of bytes, length of packets, etc., and arranged into session meta 204.

Figure 4:
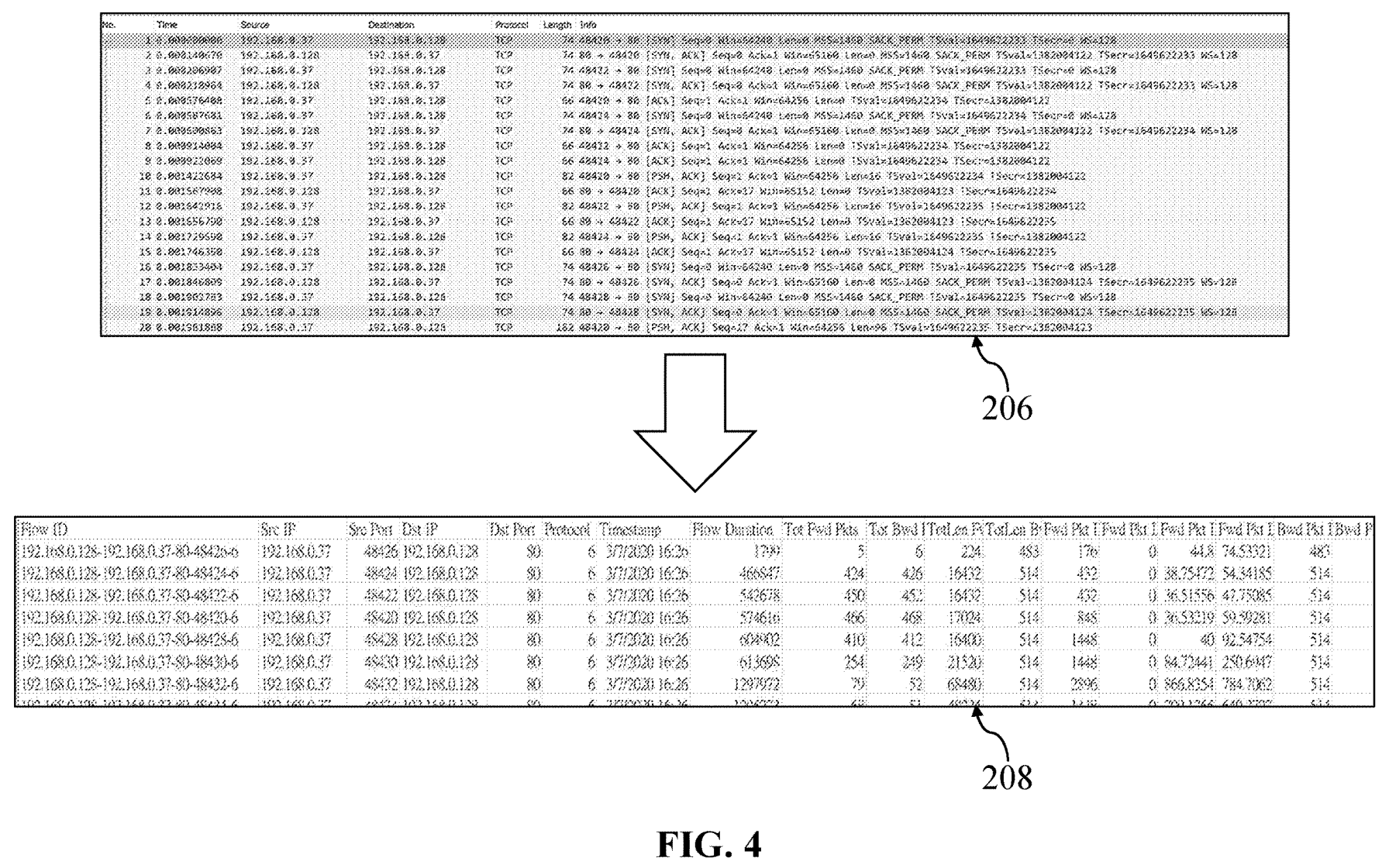

The generated session meta 204 is then output for generation of a network flow dataset at the stage S22. FIG. 4 depicts an exemplary result of the features extraction in accordance with an embodiment of the present invention. In this example, the features extraction is executed on the original packets stream 206. The statistical network traffic features 208 are extracted, calculated, and arranged into a session meta to be output as a network flow dataset.

Referring again to FIGS. 1 and 2. After the stage S22, feature selection of the stage S24 is executed by the feature selection model 122 for selecting features from the network flow dataset.

As illustrated in FIG. 5, a network flow dataset is shown to have flow-based statistical network traffic features as labelled, which are to be selected (i.e., the selected flow-based features) or dropped by the feature selection model 122.

In one embodiment, the feature selection model 122 is trained to select one or more flow-based statistical network traffic features to generate a network flow meta. The training is achieved by learning features from a training dataset comprising the network traffic of one or more cyber-attack simulations. The features selection aims to drop or ignore some of the flow-based statistical network traffic features not directly related to cyber-attacks, thereby speeding up the operation. The selected flow-based statistical network traffic features from the network flow dataset are then used for generating network flow meta of the stage S26. In accordance to one embodiment, the implementation of the feature selection model 122 includes a radial basis function neural network (RBFNN).

Figure 6:
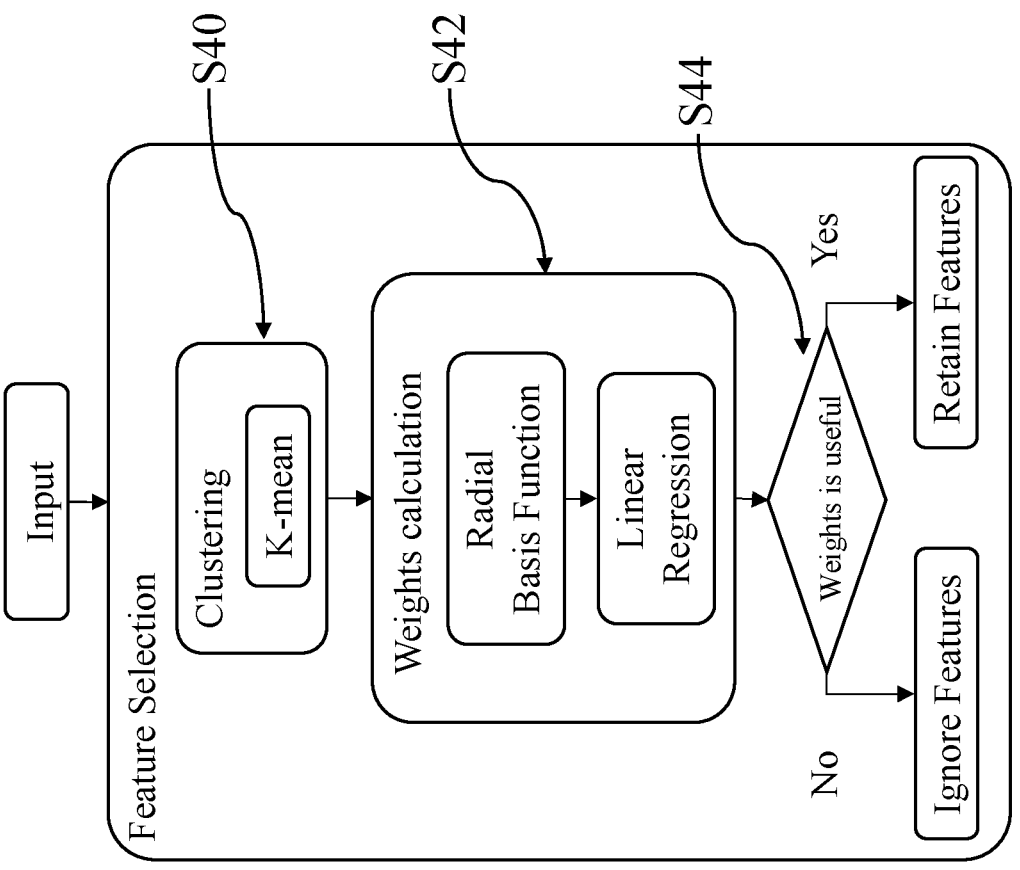
FIG. 6 depicts an illustration of a method of training a feature selection model in accordance with an embodiment of the present invention.

As illustrated in FIG. 6, a method of training the feature selection model 122 in accordance with an embodiment of the present invention includes a clustering stage S40, a weights calculation stage S42, and a weight-determining stage S44. A training dataset comprising the network traffic of one or more cyber-attack simulations is well-prepared, and calculating separately the statistical network traffic features in forward and backward directions. Then, the training dataset is inputted into the clustering stage S40, which groups the input data into clusters based on similarity using a K-means clustering algorithm to identify one or more distinct groups of input data that share similar features and can be represented by a single prototype vector.

In the weights calculation stage S42, a weight distribution is first assigned to each of the prototype vectors representing the groups of training data that share similar features based on its importance in representing the training data. The weight distribution is determined using a radial basis function, which measures the distance between the training data point and the prototype vector. After the weight distribution is calculated using the radial basis function, a linear regression is performed to determine the output weight distribution, which involves finding the optimal coefficients that minimize the difference between the predicted output and the actual output of the RBFNN.

Thereafter, in the weight-determining stage S44, as the weight distribution containing weights to be assigned to the statistical network traffic features based on radial basis function is found, each feature is assessed and determined whether to be retained or dropped/ignored. In this regard, only those features with non-zero weights are selected and at least one of the features assigned with zero weight is dropped or ignored.

In accordance to other embodiments, other implementations of the feature selection model 122 other than RBFNN are readily realizable by an ordinarily skilled person in the art without undue experimentation.

Referring again to FIGS. 1 and 2. As the network flow meta of the stage S26 is generated by the features selection, at the stage S28, the flow-based intrusion detection module 124 can analyze the network flow meta. In an embodiment, the analyzing the network flow meta is performed by features classification employing machine learning (ML) techniques, executed by the flow-based intrusion detection module 124.

In one embodiment, the implementation of the flow-based intrusion detection module 124 includes a deep neural network (DNN) trained to analyze and classify flow-based features to generate classified features. The training of the DNN is achieved by learning features from a training dataset comprising a network traffic of one or more simulated cyber-attack events. More specifically, the training and testing methods include at least these stages: features selection stage, training stage, testing stage, and output stage. In the features selection stage, clustering is applied to group similar data points, and weights for statistical network traffic features are calculated using a radial basis function. Only features with non-zero weights are selected. The selected statistical network traffic features are then used in the training stage to build and train a DNN model for the flow-based intrusion detection module 124, using a training dataset comprising cyber-attack simulations. During the training stage, the selected statistical network traffic features are utilized to build and train the DNN model, thereby optimizing the architecture to improve prediction performance. In the testing stage, the selected statistical network traffic features are fed to the trained DNN model for testing, using a testing dataset. The trained DNN model is then evaluated for accuracy based on the characteristics of the statistical network traffic features for known cyber-attack events. The output stage provides the trained DNN model for classifying known cyber-attack threats corresponding to given cyber-attack events.

Once the flow-based intrusion detection module 124 analyzes the network flow meta and generates the classified features using DNN, the next step is to convert these results into flow-based labels of the stage S29. These flow-based labels are used to identify the category or state of the network traffic, such as normal traffic, malicious traffic, attack traffic, or specific types of attacks. In one embodiment, the flow-based intrusion detection module 124 categorizes network traffic into multiple classes, such as distributed denial of service (DDoS) attacks or malware attacks, and convert the classification results into multi-class labels, where each label corresponds to a specific attack type. In another embodiment, the flow-based intrusion detection module 124 can convert the classification results into probability labels, representing the model's confidence for each category. For example, the probability of network traffic being labeled as an attack or DDoS may be 0.8, while the probability of it being normal is 0.2.

The feature selection model 122 and the flow-based intrusion detection module 124 can process those tasks through the utilization of ML techniques, thereby handling and responding flow-based traffic for network security threats in an efficient way. In an embodiment, the flow-based intrusion detection module 124 is capable of achieving near real-time ML based processing. After the stage S29, the flow-based labels can be fed into the IPM 140.

Regarding packet-based intrusion detection, at the stage S30, the network raw packet data 102 can be fed into the packet-based intrusion detection module 130. The packet-based intrusion detection module 130 is designed to detect and analyze network packets in real-time for potential threats. It utilizes a database of known threat features, which represent patterns or specific attributes of attacks, such as malware, viruses, or intrusion attempts. By analyzing the captured packets and comparing their characteristics with the known threat features, the packet-based intrusion detection module 130 can identify potential security risks.

Upon analyzing the network packets, at the stage S32, the packet-based intrusion detection module 130 generates packet-based labels to classify the packets based on their threat level. These packet-based labels help in identifying and categorizing different types of network traffic, such as normal traffic, malicious traffic, or specific types of attacks. After the stage S32, the packet-based labels can be fed into the IPM 140.

Figure 7:
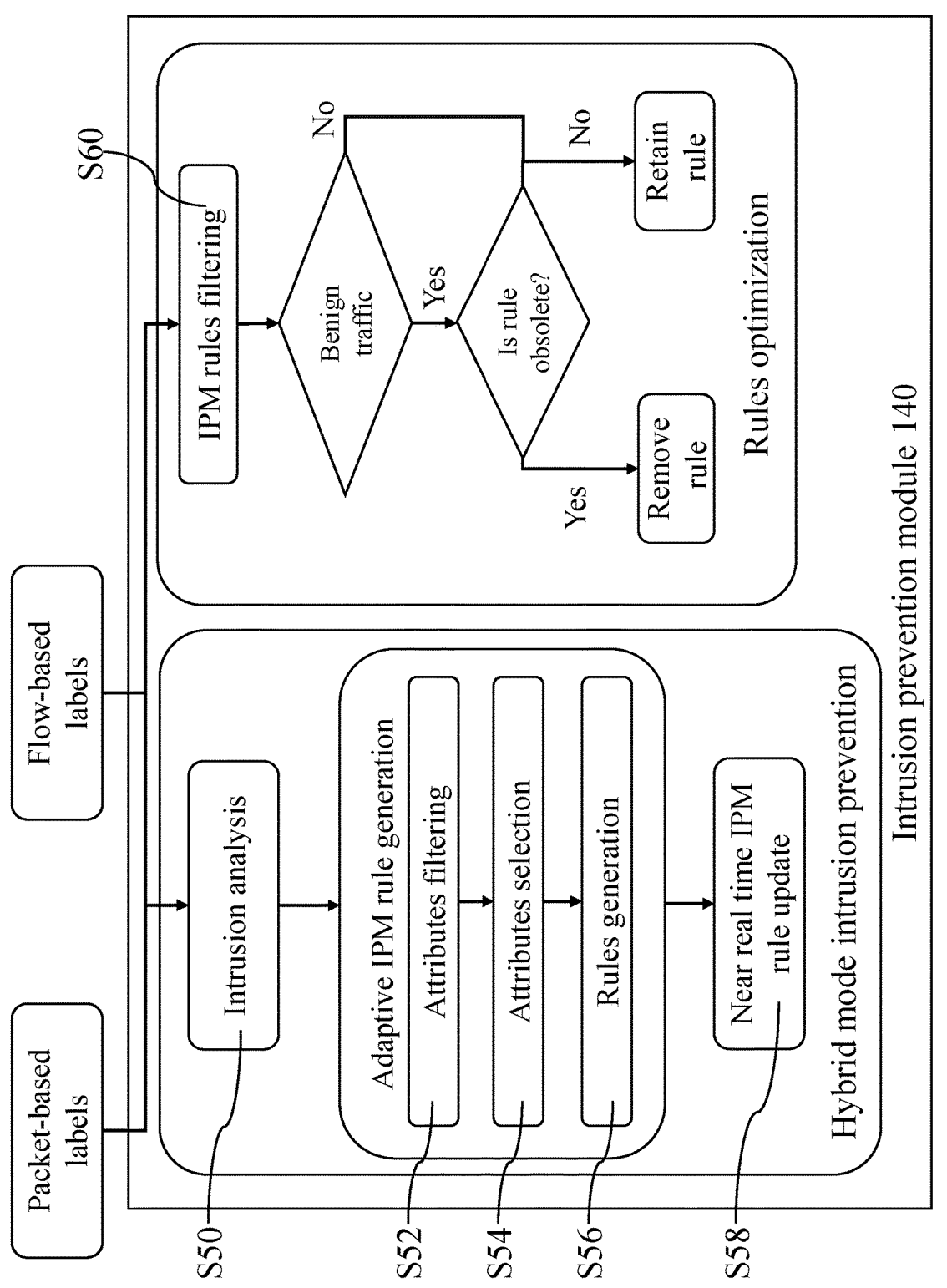
FIG. 7 depicts a schematic diagram of a method for generating and optimizing intrusion prevention rules by an intrusion prevention module (IPM) in accordance with an embodiment of the present invention.
Figure 8:
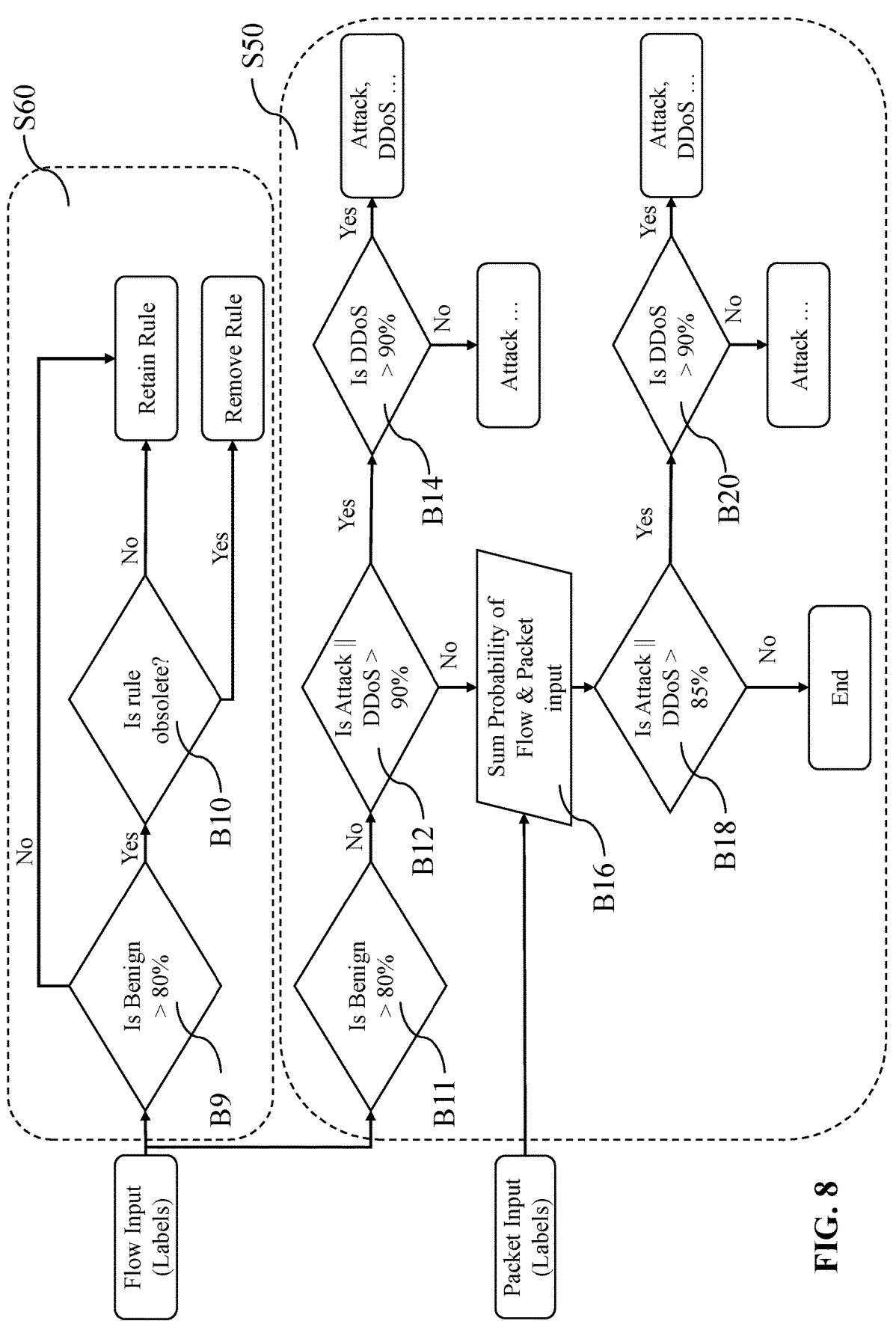
FIG. 8 depicts a schematic diagram of a processing flow for intrusion analysis and rules optimization employing flow-based labels and packet-based labels in accordance with an embodiment of the present invention.

Referring to FIGS. 7 and 8 for the following description. At the stage S34, the IPM 140 can perform intrusion analysis according to the flow-based labels and the packet-based labels so as to generate IPM rules for intrusion prevention, thereby identifying and processing the network raw packet data.

Upon the flow-based labels and the packet-based labels are fed into the IPM 140, a hybrid mode intrusion prevention and a rules optimization are performed in parallel. As illustrated in FIG. 8, the intrusion analysis S50 under the hybrid mode intrusion prevention begins with the input of flow-based labels and packet-based labels. The flow-based labels are first analyzed to determine the probability of the flow-based traffic being benign at the block B11. If the probability of benign traffic is less than or equal to 80%, the IPM 140 proceeds to a more detailed analysis. It first determines if the traffic is categorized as an attack or a DDoS attack based on the flow-based labels at the block B12. If the probability in this determination is greater than 90%, the IPM 140 further assesses whether the probability of a DDoS attack is also greater than 90% at the block B14. If it is, the traffic is conclusively classified as a DDoS attack; otherwise, it is identified as other attacks.

Should the traffic not be identified as a DDoS or other attack at the block B12, it proceeds to the next stage, sum the Probability of Flow & Packet input, at the block B16. This stage takes both flow-based and corresponding packet-based labels as inputs, then the IPM 140 calculates the overall probability of the traffic being an attack or a DDoS attack by summing the probabilities obtained from both types of labels. Next, at the block B18, the IPM 140 analyzes the overall probability obtained from the previous step. If the overall probability is greater than 85% for an attack or a DDoS attack, the traffic undergoes further scrutiny. The IPM 140 identifies whether the traffic is an attack or a DDoS attack at the block B20. If the probability of a DDoS attack is greater than 90%, the traffic is classified as a DDoS attack; otherwise, it is identified as other attacks. Similarly, as the traffic is not identified as a DDoS or other attack, the IPM 140 allows it to pass through. The probability values provided herein are for illustrative purposes only and do not limit the present invention. In various embodiments, different values or implementations of intrusion analysis can be used according to specific network environment and security requirements.

As illustrated in FIG. 7, the IPM 140 further performs adaptive IPM rule generation for those traffics to be blocked, including attributes filtering S52 with respect to the flow-based labels and the packet-based labels, attributes selection S54 that selects relevant attributes from filtered data from the attributes filtering, and rules generation S56 according to selected data from the attributes selection. More specifically, the filtered data and the selected data may contain network attributes, including protocol, IP, hostname, port, packet string, interface, packet size, packet TTL, or combinations thereof. After the adaptive IPM rule generation, the IPM 140 further performs near real time IPM rule update S58 according to outcomes of the rules generation of the adaptive IPM rule generation.

Furthermore, the IPM 140 performs the rules optimization, of which the primary purpose is to remove obsolete IPM rules. The rules optimization may be performed concurrently with the adaptive IPM rule generation. The rules optimization includes IPM rules filtering S60 for determining the corresponding IPM rules. In an embodiment, the IPM rules filtering S60 is performed on the network traffic represented by the flow label. Referring is made to FIG. 8, in the IPM rules filtering S60, the flow-based labels are analyzed to determine the probability of the flow-based traffic being benign at the block B9. If the target traffic (i.e., the flow-based traffic) is not benign, the IPM rules corresponding to its attributes will be retained. If the probability of benign traffic exceeds 80%, the next is to determine if the IPM rules for this target traffic are obsolete at the block B10; the IPM rule determined to be obsolete is removed and the IPM rule determined to be not obsolete is retained. For example, if one of the IPM rules is not triggered for a long time (exceeding a threshold time under an IPM rule obsolete definition), this rule complies with the obsolete definition and is therefore removed.

Referring again to FIG. 1. The IPM rules can be inputted to the processing kernel 150 so as to block malicious traffic according to the IPM rules, in which the blocked information or historical records are stored in the firewall blocked zone 152 for further analyzing, such as patch updating for firewalls. The traffic allowed to pass through can enter the network interface 112 and then become outgoing network raw packet data 104 which represents network traffic without any malicious attacks.

In one embodiment, after blocking the malicious traffic via employing the IPM rules, the display 114 correspondingly displays a dashboard to show the number of blocked packets, thereby informing users of information about the processing result.

The system structure as described above can be deployed for complying various application requirements, such as all-in-one router/edge based for small and medium-sized enterprises (SME), home use, centralized analytics for enterprise, region, and sector use.

Figure 9:
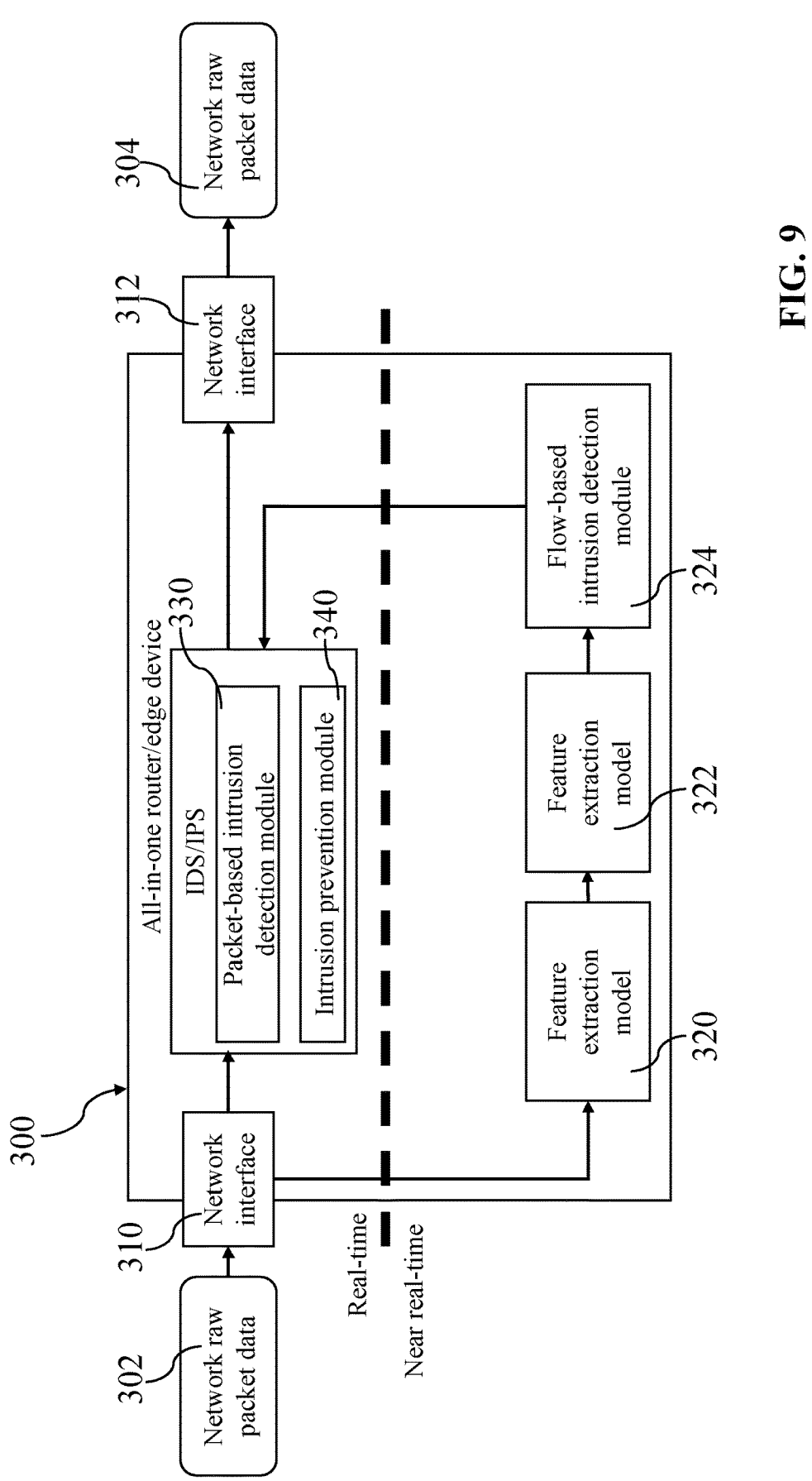
FIG. 9 depicts a schematic diagram of an apparatus for generating cyber threat intelligence in accordance with a third aspect of the present invention.

FIG. 9 depicts a schematic diagram of an apparatus 300 for generating cyber threat intelligence in accordance with a third aspect of the present invention. The apparatus 300 is an integration of an IDS and an IPS for all-in-one router/edge based for SME or home use for individual user, including network interfaces 310, 312, a feature extraction model 320, a feature selection model 322, a flow-based intrusion detection module 324, a packet-based intrusion detection module 330, and an intrusion prevention module 340.

The network raw packet data 302 enters the apparatus 300 via the network interface 310. The feature extraction model 320, the feature selection model 322, and the flow-based intrusion detection module 324 cooperate with each other as afore-described, including generating network flow meta and outputting flow-based labels. The packet-based intrusion detection module 330 outputs packet-based labels. The intrusion prevention module 340 collects the flow-based labels and the packet-based labels to proceed blocking malicious traffic. Network raw packet data 304 without malicious attacks can leave the apparatus 300 via the network interface 312. With this advanced solution, users can avoid malicious traffic without complicated or cumbersome operations.

Figure 10:
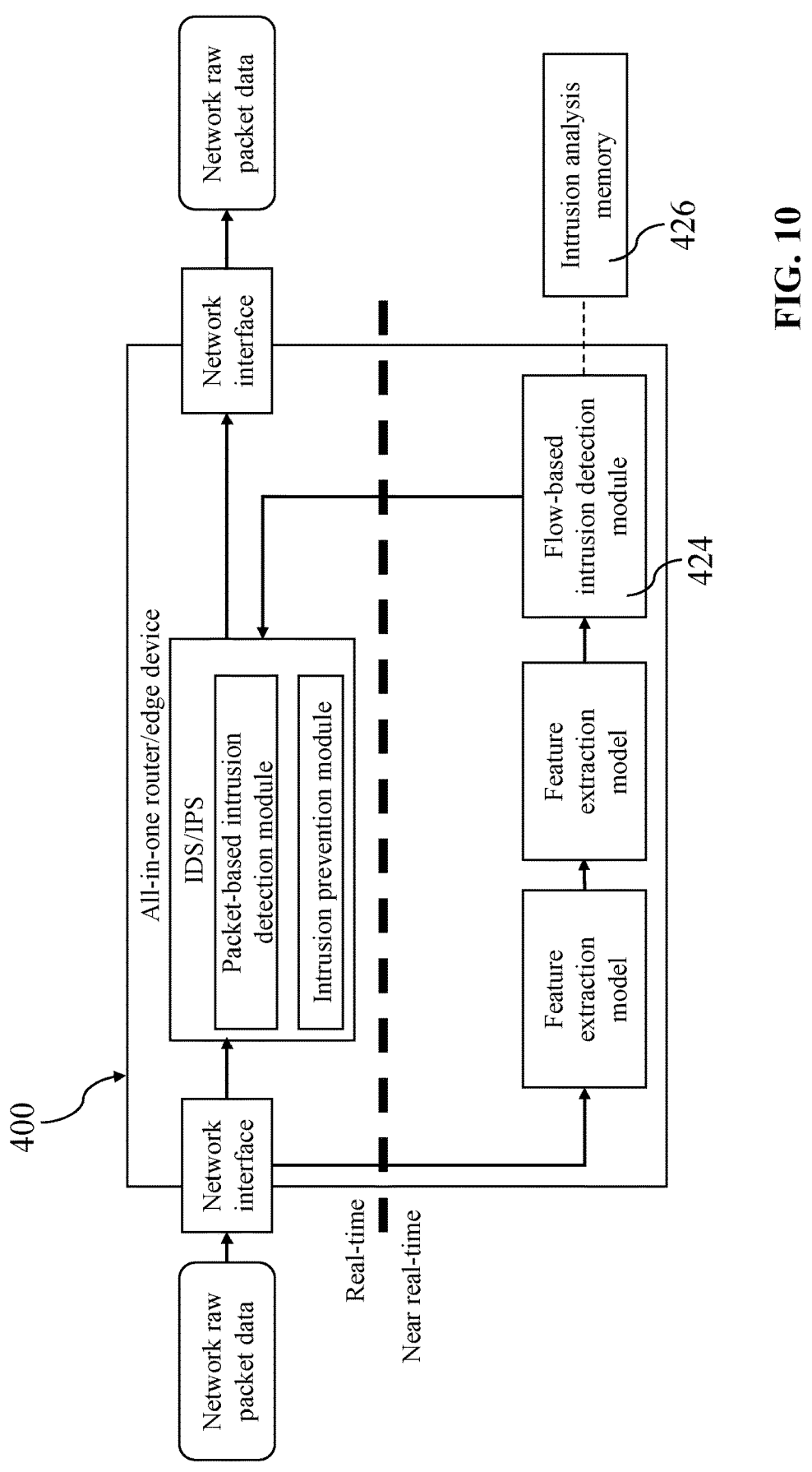
FIG. 10 depicts a schematic diagram of an apparatus for generating cyber threat intelligence in accordance with a fourth aspect of the present invention.

FIG. 10 depicts a schematic diagram of an apparatus 400 for generating cyber threat intelligence in accordance with a fourth aspect of the present invention. The apparatus 400 has a configuration similar to that illustrated in FIG. 9, except the apparatus 400 further includes an Intrusion analysis memory 426 electrically coupled with the flow-based intrusion detection module 424 and configured to store analyzing outcomes of the flow-based intrusion detection module 424 to be accessed. In an embodiment, the network flow meta and analyzing outcomes are stored in the Intrusion analysis memory 426 and can be exported as formatted electronic documents for further analysis.

Figure 11:
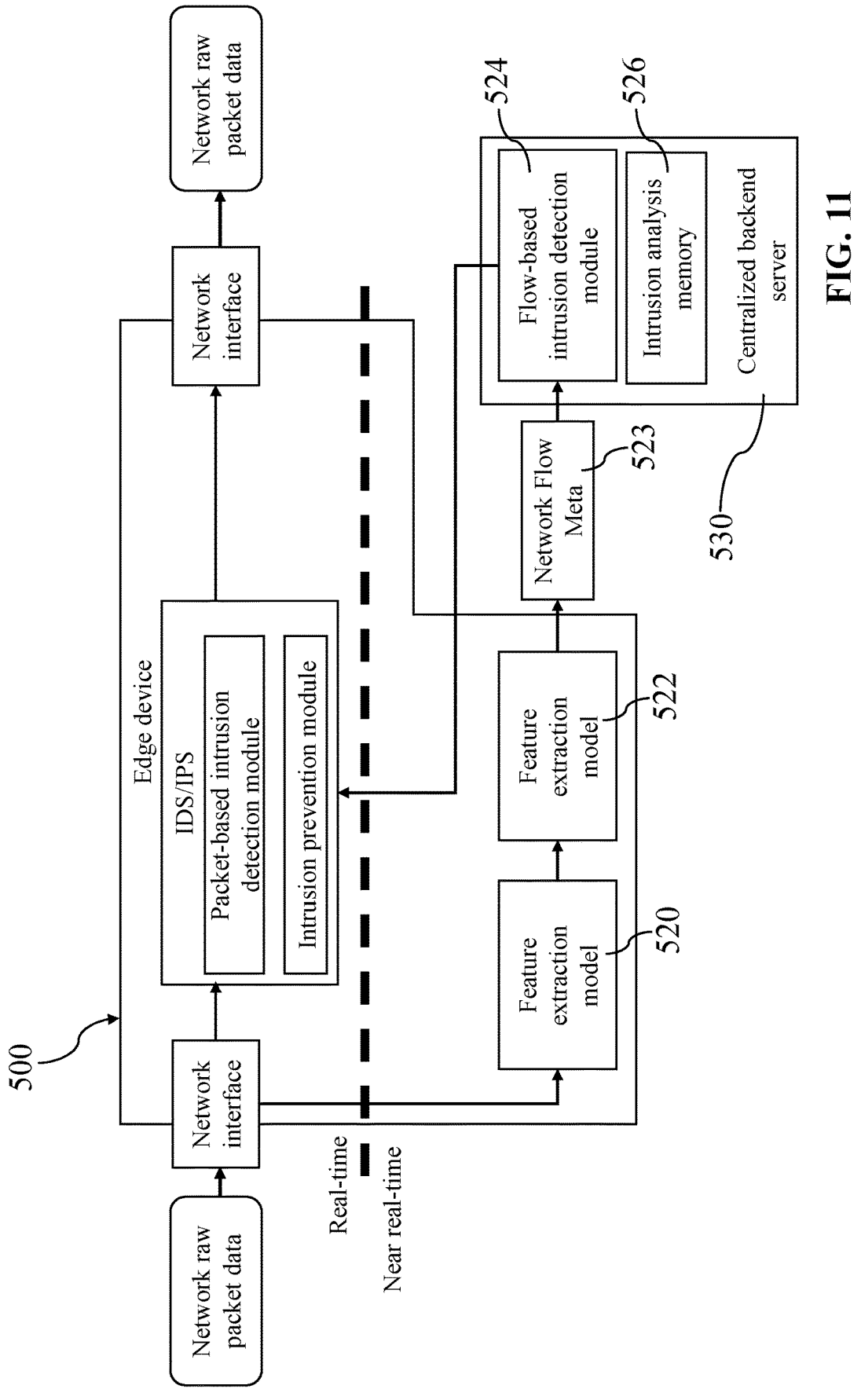
FIG. 11 depicts a schematic diagram of an apparatus for generating cyber threat intelligence in accordance with a fifth aspect of the present invention.

FIG. 11 depicts a schematic diagram of an apparatus 500 for generating cyber threat intelligence in accordance with a fifth aspect of the present invention. The apparatus 500 is an integration of an IDS and an IPS for centralized analytics for enterprise, region, or sector use and has a configuration similar to that illustrated in FIG. 9, except the apparatus 500 further includes a centralized backend server 530 and Intrusion analysis memory 526. The flow-based intrusion detection module 524 and the Intrusion analysis memory 526 are deployed to the centralized backend server 530. In this regard, the feature extraction model 520 and the feature selection model 522 cooperate with each other as afore described, so as to generate network flow meta 523 which is then fed to the centralized backend server 530.

In the centralized backend server 530, the flow-based intrusion detection module 524 can generate flow-based labels according to the network flow meta 523, which are inputted to the IDS/IPS as well as stored in the Intrusion analysis memory 526. With such configuration, users can access the centralized backend server 530 to extract historical records regarding the generation of the flow-based labels from the intrusion analysis memory 526 for further analysis. Furthermore, other relevant users can also access the centralized backend server 530 to gain insights into different devices' encounters with malicious attacks, fostering collaboration among users.

As discussed above, by combining ML techniques, the generation of flow-based labels effectively handles network security threats. The intrusion detection module achieves near real-time ML-based processing, enabling timely identification and mitigation of potential threats. The integration of flow-based labels and packet-based labels allows for rapid and accurate detection and response to cyber-attacks. Furthermore, the architecture can be applied to various occasions, allowing for compliance with a wider range of product requirements.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for intrusion detection and prevention of cyber threat intelligence, comprising:
   a network interface executed by at least one processor and configured to receive network raw packet data;
   a feature extraction model executed by at least one processor and configured to parse packets from the network raw packet data into sessions as a network flow dataset;
   a feature selection model executed by at least one processor and configured to select flow-based features from the network flow dataset to generate network flow meta;
   a flow-based intrusion detection module comprising instructions, executed by at least one processor, and configured to analyze the network flow meta by classifying the flow-based features using a trained neural network to generate flow-based labels;
   a packet-based intrusion detection module comprising instructions, executed by at least one processor, and configured to analyze the network raw packet data by comparing packet characteristics with stored threat features to generate packet-based labels;
   an intrusion prevention module (IPM) comprising instructions, executed by at least one processor, and conducting data communication using wired or wireless communication with the flow-based intrusion detection module and the packet-based intrusion detection module to receive the flow-based labels and the packet-based labels, wherein the IPM is configured to:
   perform intrusion analysis according to the flow-based labels and the packet-based labels so as to generate one or more IPM rules for intrusion prevention, thereby identifying and processing the network raw packet data, wherein the IPM is further configured to perform adaptive IPM rule generation, comprising:
   attributes filtering with respect to the flow-based labels and the packet-based labels;
   attributes selection for selecting relevant attributes from filtered data from the attributes filtering; and
   rules generation according to selected attributes from the attributes selection;
   wherein the IPM is further configured to perform rules optimization, comprising:
   IPM rules filtering for determining whether a target traffic is benign;
   if the target traffic is not benign, retaining the one or more IPM rules corresponding to the target traffic attributes; and
   else if the target traffic is benign, determining whether each of the IPM rules corresponding to the target traffic attributes is obsolete under an IPM rule obsolete definition and removing each of the obsolete IPM rules, wherein the IPM rule obsolete definition comprises a condition that the corresponding IPM rule not having been triggered for a time duration exceeding a threshold time.

2. The apparatus of claim 1, further comprising a display configured to display a dashboard to show the number of packets after blocking malicious traffic via employing the IPM rules.

3. The apparatus of claim 1, further comprising an intrusion analysis memory configured to store analyzing outcomes of the flow-based intrusion detection module to be accessed.

4. The apparatus of claim 3, further comprising a centralized backend server to which the flow-based intrusion detection module and the intrusion analysis memory are deployed.

5. The apparatus of claim 1, wherein the intrusion analysis performed by the IPM further comprises obtaining a sum probability of flow and packet input from the flow-based labels and the packet-based labels.

6. The apparatus of claim 1, wherein the IPM is further configured to perform near real time IPM rule update according to outcomes of the rules generation.

7. The apparatus of claim 1, wherein the IPM performs the adaptive IPM rule generation using network attributes comprising protocol, Internet Protocol (IP) address, hostname, port, packet string, interface, packet size, packet Time to Live (TTL), or combinations thereof.

8. The apparatus of claim 1, wherein the feature selection model is at least implemented by a radial basis function neural network (RBFNN) and the flow-based intrusion detection module is at least implemented by a deep neural network (DNN).

9. The apparatus of claim 1, wherein the feature selection model is further configured to perform clustering on the network flow dataset using a K-means clustering algorithm to group the flow-based features prior to the attributes filtering.

10. The apparatus of claim 1, wherein the feature selection model is further configured to assign a weight to each of the flow-based features using a radial basis function, and wherein the feature selection model retains first flow-based features with non-zero weights and drops second flow-based features with zero weights.

11. A method for intrusion detection and prevention of cyber threat intelligence, comprising:

parsing packets, by at least one processor, from network raw packet data into sessions as a network flow dataset via a feature extraction model;

selecting flow-based features, by at least one processor, from the network flow dataset to generate network flow meta via a feature selection model;

analyzing the network flow meta and generating flow-based labels by a flow-based intrusion detection module;

analyzing the network raw packet data and generating packet-based labels by a packet-based intrusion detection module;

performing intrusion analysis, by an intrusion prevention module (IPM), according to the flow-based labels and the packet-based labels so as to generate one or more IPM rules for intrusion prevention, thereby identifying and processing the network raw packet data;

performing, by the IPM, adaptive IPM rule generation, comprising:

performing attributes filtering with respect to the flow-based labels and the packet-based labels;

performing attributes selection that selects relevant attributes from filtered data from the attributes filtering; and performing rules generation according to selected attributes from the attributes selection; and performing, by the IPM, rules optimization, comprising:

IPM rules filtering for determining whether a target traffic is benign;

if the target traffic is not benign, retaining the one or more IPM rules corresponding to the target traffic attributes; and else if the target traffic is benign, determining whether each of the IPM rules corresponding to the target traffic attributes is obsolete under an IPM rule obsolete definition and removing each of the obsolete IPM rules, wherein the IPM rule obsolete definition comprises a condition that the corresponding IPM rule has not been triggered for a duration exceeding a threshold time.

12. The method of claim 11, further comprising displaying a dashboard, by a display, to show the number of packets after blocking malicious traffic via employing the IPM rules.

13. The method of claim 11, further comprising storing, by an intrusion analysis memory, analyzing outcomes of the flow-based intrusion detection module to be accessed.

14. The method of claim 13, further comprising deploying the flow-based intrusion detection module and the intrusion analysis memory to a centralized backend server.

15. The method of claim 11, wherein the intrusion analysis performed by the IPM further comprises obtaining a sum probability of flow and packet input from the flow-based labels and the packet-based labels.

16. The method of claim 11, further comprising performing, by the IPM, near real time IPM rule update according to outcomes of the rules generation.

17. The method of claim 11, wherein the IPM performs the adaptive IPM rule generation using network attributes comprising protocol, Internet Protocol (IP) address, hostname, port, packet string, interface, packet size, packet Time to Live (TTL), or combinations thereof.

18. The method of claim 11, wherein the feature selection model is at least implemented by a radial basis function neural network (RBFNN) and the flow-based intrusion detection module is at least implemented by a deep neural network (DNN).

19. The method of claim 11, further comprising:

performing, by the feature selection model, clustering on the network flow dataset using a K-means clustering algorithm to group the flow-based features prior to the attributes filtering.

20. The method of claim 11, further comprising:

assigning, by the feature selection model, a weight to each of the flow-based features using a radial basis function, wherein the feature selection model retains first flow-based features with non-zero weights and drops second flow-based features with zero weights.

* * * * *